(12) United States Patent
Alleman et al.

(10) Patent No.: US 8,127,915 B2
(45) Date of Patent: Mar. 6, 2012

(54) SYSTEM AND METHOD FOR SEPARATING A CLUSTER OF INTERCONNECTED FOOD PRODUCTS

(75) Inventors: Ernest J. Alleman, Chambersburg, PA (US); Ray E. Martin, Greencastle, PA (US); Roger L. Henneberger, Chambersburg, PA (US); Kevin J. Allen, Valdosta, GA (US)

(73) Assignee: Martin's Famous Pastry Shoppe, Inc., Chambersburg, PA (US)

( * ) Notice: Subject to any disclaimer, the term of this patent is extended or adjusted under 35 U.S.C. 154(b) by 213 days.

(21) Appl. No.: 12/643,814

(22) Filed: Dec. 21, 2009

(65) Prior Publication Data

US 2011/0147163 A1    Jun. 23, 2011

(51) Int. Cl.
*B65G 47/31* (2006.01)
(52) U.S. Cl. .............. 198/419.2; 198/428; 198/461.3; 198/689.1; 198/415; 198/442; 99/443 C
(58) Field of Classification Search .............. 198/419.2, 198/428, 461.1–461.3, 689.1, 415, 442; 99/443 C
See application file for complete search history.

(56) References Cited

U.S. PATENT DOCUMENTS

| | | | |
|---|---|---|---|
| 1,939,810 A | 12/1933 | Green | |
| 2,450,033 A | 9/1948 | Cohen | |
| 2,765,065 A | 10/1956 | Leibelt | |
| 3,080,079 A | 3/1963 | Lecrone et al. | |
| 3,322,314 A | 5/1967 | Irving, Jr. et al. | |
| 3,324,987 A | 6/1967 | Kiesser | |
| 3,576,249 A | 4/1971 | Grissinger | |
| 3,757,925 A | 9/1973 | Luther | |
| 4,546,870 A | 10/1985 | Cogo | |
| 4,815,851 A * | 3/1989 | Soohoo | 356/470 |
| 5,183,144 A * | 2/1993 | Francioni | 198/382 |
| 5,316,123 A * | 5/1994 | Achelpohl | 198/416 |
| 5,680,743 A | 10/1997 | Hoekzema | |
| 5,893,701 A | 4/1999 | Pruett | |
| 5,971,134 A * | 10/1999 | Trefz et al. | 198/460.1 |
| 6,000,528 A | 12/1999 | van Maanen | |
| 6,044,959 A * | 4/2000 | Monsees | 198/461.1 |
| 6,164,436 A * | 12/2000 | Taylor | 198/689.1 |
| RE37,008 E | 1/2001 | Sanchez et al. | |
| 6,227,349 B1 | 5/2001 | Finkowski et al. | |
| 6,371,304 B2 | 4/2002 | Gambini | |

(Continued)

FOREIGN PATENT DOCUMENTS

DE    1532917 A1    2/1970

(Continued)

*Primary Examiner* — Mark A Deuble
(74) *Attorney, Agent, or Firm* — McNees Wallace & Nurick LLC

(57) ABSTRACT

A system for separating a cluster of interconnected food products is disclosed. The system includes a first conveyor, a second conveyor, a suction subsystem, and a sensor. The first conveyor includes a discharge end and a first permeable conveyor belt. The second conveyor, in series with the first conveyor, includes an intake end and a second permeable conveyor belt. The first and second conveyors are configured to independently accelerate and decelerate. The suction subsystem, which includes an intake portion proximate to the discharge end and the intake end, is configured, arranged and disposed to generate suction through the first permeable conveyor belt at a first region proximate to the discharge end and through the second permeable conveyor belt at a second region proximate to the intake end. The sensor is configured, arranged and disposed to sense a leading edge of the cluster as the cluster is conveyed by the system.

20 Claims, 6 Drawing Sheets

U.S. PATENT DOCUMENTS

| | | | |
|---|---|---|---|
| 6,712,197 B2 | 3/2004 | Kubota et al. | |
| 6,848,566 B2 | 2/2005 | Harnish et al. | |
| 7,090,067 B2 * | 8/2006 | Schiesser et al. | 198/395 |
| 7,306,087 B1 | 12/2007 | Hamsten | |
| 7,472,783 B2 * | 1/2009 | Mouette et al. | 198/415 |
| 2005/0061627 A1 * | 3/2005 | Muller | 198/689.1 |

FOREIGN PATENT DOCUMENTS

| | | |
|---|---|---|
| EP | 1161870 A1 | 12/2001 |
| EP | 1321040 A1 | 6/2003 |
| GB | 2173758 A | 10/1986 |
| GB | 2398480 A | 8/2004 |

* cited by examiner

SYSTEM AND METHOD FOR SEPARATING A CLUSTER OF INTERCONNECTED FOOD PRODUCTS

FIELD OF THE INVENTION

The present invention is directed to a system and method for separating a cluster of interconnected food products.

BACKGROUND OF THE INVENTION

Downstream processing of clusters of interconnected food products, including freshly-baked bread products (e.g., dinner rolls), generally relies very significantly on laborers. In many instances, laborers are needed, for example, to inspect food products, to separate food products, or to orient them in preparation for further processing (e.g., packaging). Additionally, laborers are often favored over machines because of their ability to separate clusters of relatively delicate interconnected food products (e.g., dinner rolls) without marring them. However, because multiple cluster configurations (e.g., 8×6, 12×8) are often processed during the course of a single shift, the number of laborers actually required at any given time during the course of a single shift can vary significantly. This results in the following scheduling dilemma: if a sufficient number of laborers are scheduled for a shift, some of them will inevitably not be needed during the processing of those cluster configurations that are less labor intensive.

Accordingly, there is a need for a system that will at least partially mitigate the foregoing problem by automating the process of separating clusters of interconnected food products. There is an additional need for a system that can separate clusters of relatively delicate interconnected food products without marring them, and that can receive and process multiple cluster configurations.

SUMMARY OF THE INVENTION

In accordance with one aspect of the present invention, a system for separating a cluster of interconnected food products is disclosed. The system includes a first conveyor, a second conveyor, a suction subsystem, and a sensor. The first conveyor includes a discharge end and a first permeable conveyor belt and is configured to decelerate and accelerate. The second conveyor, which is in series with the first conveyor, includes an intake end and a second permeable conveyor belt and is configured to accelerate and decelerate. The suction subsystem, which includes an intake portion proximate to the discharge end of the first conveyor and the intake end of the second conveyor, is configured, arranged and disposed to generate suction through the first permeable conveyor belt at a first region proximate to the discharge end and to generate suction through the second permeable conveyor belt at a second region proximate to the intake end. The sensor is configured, arranged and disposed to sense a leading edge of a cluster of interconnected food products as the cluster of interconnected food products is being conveyed by the system.

In accordance with another aspect of the present invention, a system for separating a cluster of interconnected food products is disclosed. The system includes a first conveyor, a second conveyor, a suction subsystem, a sensor, and a controller. The first conveyor, which is in communication with the controller, includes a discharge end and a first permeable conveyor belt and is configured (1) to respond to commands received from the controller, (2) to convey at a first speed, (3) to decelerate from the first speed to a second speed, (4) to convey at the second speed, and (5) to accelerate from the second speed to a third speed selected from the group consisting of the first speed and another speed greater than the second speed. The second conveyor, which is in series with the first conveyor and in communication with the controller, includes an intake end and a second permeable conveyor belt and is configured (1) to respond to commands received from the controller, (2) to convey at the first speed, (3) to accelerate from the first speed to a fourth speed, (4) to convey at the fourth speed, and (5) to decelerate from the fourth speed to a fifth speed selected from the group consisting of the first speed and another speed less than the fourth speed. The suction subsystem, which includes an intake portion proximate to the discharge end and the intake end, is configured, arranged and disposed (1) to generate suction through the first permeable conveyor belt at a first region proximate to the discharge end and (2) to generate suction through the second permeable conveyor belt at a second region proximate to the intake end. The sensor, which is in communication with the controller, is configured, arranged and disposed (1) to sense a leading edge of a cluster of interconnected food products as the cluster of interconnected food products is being conveyed by the system and (2) to send a corresponding signal to the controller. The controller is configured to receive the corresponding signal from the sensor and, in response to the received corresponding signal, command the first conveyor to decelerate from first speed to second speed and the second conveyor to substantially simultaneously accelerate from the first speed to the fourth speed to separate, along a plane substantially perpendicular to and between the first region and the second region, the cluster of interconnected food products into a first portion and a second portion as the cluster of interconnected food products is being conveyed over the first region and the second region.

In accordance with yet another aspect of the present invention, a method of separating a cluster of interconnected food products is disclosed. The method includes providing a first conveyor, a second conveyor, a suction subsystem, and a cluster of interconnected food products. The first conveyor, which includes a discharge end and a first permeable conveyor belt, is configured to operate at a first speed and to decelerate from the first speed. The second conveyor, which is in series with the first conveyor, includes an intake end and a second permeable conveyor belt and is configured to operate at a speed substantially equal to the first speed and to accelerate from the first speed. The suction subsystem, which includes an intake portion proximate to the discharge end of the first conveyor and the intake end of the second conveyor, is configured, arranged and disposed (1) to generate suction through the first permeable conveyor belt at a first region proximate to the discharge end and (2) to generate suction through the second permeable conveyor belt at a second region proximate to the intake end. The cluster of interconnected food products includes a first portion and a second portion, the first portion adjoining the second portion. The method includes operating the first conveyor at a first speed, operating the second conveyor at a speed substantially equal to the first speed, and operating the suction subsystem to generate suction through the first region and the second region. Additionally, the method includes (1) conveying the cluster of interconnected food products until the first portion overlies the first region and the second portion overlies the second region and (2) decelerating the first conveyor and substantially simultaneously accelerating the second conveyor to apply tensional forces to the cluster of interconnected food products along a first plane of separation between the first portion and the second portion, the tensional forces being sufficient to separate the cluster of interconnected food products along the first plane of separation, thereby yielding a first discrete portion and a second discrete portion.

Among the advantages of the present invention are that it automates the process of separating clusters of interconnected food products, that it can separate clusters of relatively delicate interconnected food products (e.g., dinner rolls) without marring them, and that it can receive and process multiple cluster configurations (e.g., 8×6, 12×8).

Other features and advantages of the present invention will be apparent from the following more detailed description of the corresponding embodiments, taken in conjunction with the accompanying drawings which illustrate, by way of example, the principles of the invention.

BRIEF DESCRIPTION OF THE DRAWINGS

Wherever possible, the same reference numbers are used throughout the drawings to refer to the same or like parts.

DETAILED DESCRIPTION OF THE INVENTION

Figure 1:
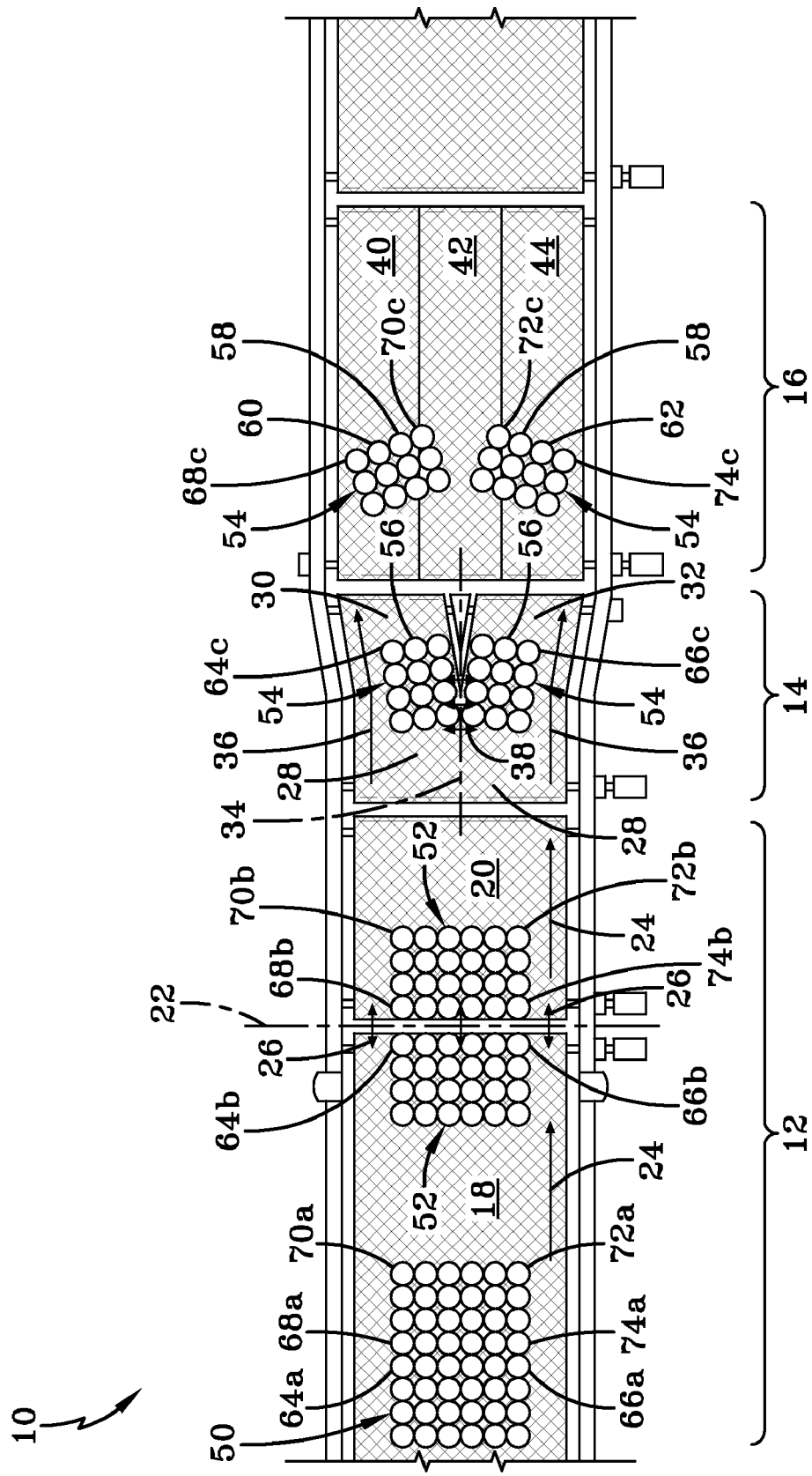
FIG. 1 is a top plan view of an exemplary embodiment of the present invention, i.e., the system for separating a cluster of interconnected food products, and shows the system along with a series of clusters in various stages of the separation process.

FIG. 1 provides an overview of an exemplary embodiment of the system for separating interconnected food products. System 10 may include a series of three subsystems: a first separator subsystem 12, a second separator subsystem 14, and a turner subsystem 16. Referring to FIG. 1, first separator subsystem 12 includes a first conveyor 18 and a second conveyor 20. As explained more fully below, first conveyor 18 and second conveyor 20 operate in a coordinated manner to separate interconnected food products along a plane 22 substantially perpendicular to a first direction of conveyance, which direction is represented by arrows 24. This separation is achieved by applying tensional forces 26 substantially perpendicular to plane 22, which are related to acceleration forces in the direction of conveyance and deceleration forces opposite the direction of conveyance.

Second separator subsystem 14, which is adjacent first separator subsystem 12, includes a diverging conveyor 28. As shown in FIG. 1, diverging conveyor 28 may include a third conveyor 30 and a fourth conveyor 32, which are configured to operate substantially in parallel (as opposed to in series) in a coordinated manner to separate interconnected food products along a plane 34 substantially parallel to a second direction of conveyance, which is represented by arrows 36. Third conveyor 30 and fourth conveyor 32 diverge at a predetermined angle, generating the tensional forces 38 that cause the described separation. Tensional forces 38 are substantially perpendicular to the second direction of conveyance 36.

Turner subsystem 16, which is adjacent second separator subsystem 14, may include a trio of conveyors arranged and disposed in parallel with one another, more specifically, a first outside conveyor 40, an inside conveyor 42, and a second outside conveyor 44. As suggested by the orientation of clusters 60, 62 of interconnected food products in FIG. 1, turner subsystem 16 is configured to enable the speed of inside conveyor 42 to be controlled independently of the speed of both first outside conveyor 40 and second outside conveyor 44. For example, inside conveyor 42 may be operated at a slower speed than either first outside conveyor 40 or second outside conveyor 44, which may be operated at substantially equal speeds, to turn clusters of interconnected food products, orienting them as required for downstream processing in some applications. Alternatively, inside conveyor 42 may be operated at a faster speed than either first outside conveyor 40 or second outside conveyor 44 to turn clusters of interconnected food products. In applications where no turning of clusters of interconnected food products is required in preparation for downstream processing, inside conveyor 42 is operated at substantially the same speed as first outside conveyor 40 and second outside conveyor 44, in effect eliminating the need to divert flow of interconnected food products around turner subsystem 16. This flexibility allows turner subsystem 16 to remain "on-line" even during applications where no turning of clusters is desired.

Referring still to FIG. 1, system 10 may be used to process a flow of clusters of interconnected food products. By way of example, FIG. 1 shows a 48-roll cluster 50 of interconnected food products (e.g., dinner rolls) that has not yet been separated. Two 24-roll clusters 52 of interconnected food products, both of which lie downstream from 48-roll cluster 50, are derived from another 48-roll cluster of interconnected food products that already has been separated by first separator subsystem 12. Similarly, 12-roll clusters 54 of interconnected food products, all of which lie downstream from 24-roll clusters 52, are derived originally from yet another 48-roll cluster of interconnected food products that has already been separated by first separator subsystem 12. The 12-roll clusters 54 of a first 12-roll cluster pair 56 have nearly completed the process of being separated from one another by second separation subsystem 14. The 12-roll clusters 54 of a second 12-roll cluster pair 58, which lie downstream from first pair 56, already have completed the separation process performed by second separation subsystem 14 and are shown in the process of being turned by turner subsystem 16 in preparation for additional processing downstream. More specifically, inside conveyor 42 of turner subsystem 16 is being operating at a slower speed than either first outside conveyor 40 or second outside conveyor 44, causing 12-roll cluster 60 to rotate clockwise as it is being conveyed. In contrast, 12-roll cluster 62 is being rotated counter-clockwise as it is being conveyed. Corresponding individual food products (e.g., dinner rolls) 64*a-c*, 66*a-c*, 68*a-c*, 70*a-c*, 72*a-c*, and 74*a-c* serve as reference points in FIG. 1 to facilitate an understanding of how interconnected food products can be separated and turned by system 10. The angle of rotation is dependent on the length of turner subsystem 16 and the speed differential between inside conveyor 42 and either first outside conveyor 40 or second outside conveyor 44.

Figure 2:
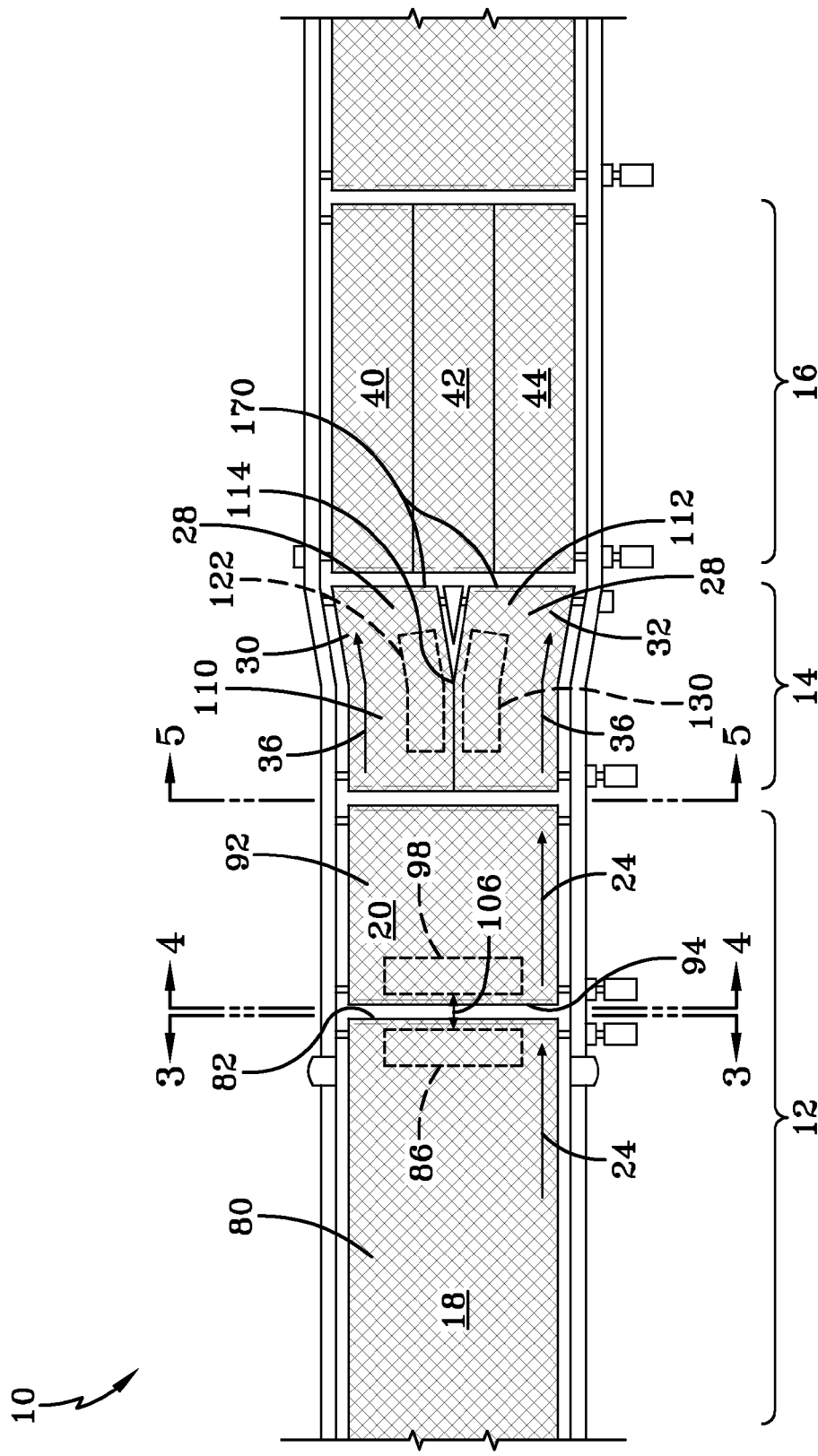
FIG. 2 is a top plan view of an exemplary embodiment of the present invention.
Figure 3:
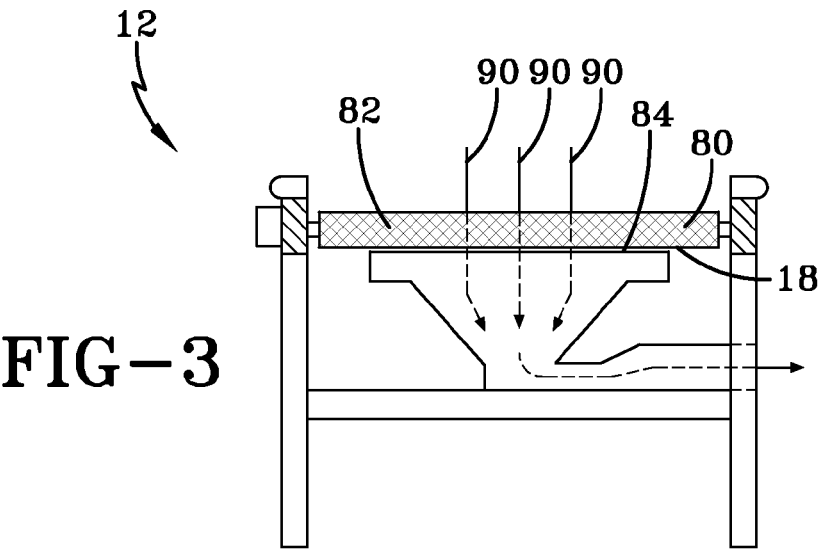
FIG. 3 is a cross-section view, taken along lines 3-3 of FIG. 2, of an exemplary embodiment of the present invention.

Referring to FIGS. 2 and 3, first conveyor 18 of first separator subsystem 12 includes a first permeable conveyor belt 80. As used herein, the term "permeable conveyor belt" includes conveyor belts having a percentage of open area, for example, Intralox® LLC (Harahan, La.) Series 1100 flush grid flattop belt, which has a percentage of open area of approximately 63%. Accordingly, air can flow relatively freely through first permeable conveyor belt 80. Referring to FIGS. 2 and 3, proximate to a first discharge end 82 of first conveyor 18 is a first intake portion 84 of a suction subsystem (see FIG. 12 at 166). When suction subsystem 166 is activated, air is drawn through first permeable conveyor belt 80 into first intake portion 84. First intake portion 84 is arranged and disposed to yield a first suction region 86 upon activation of suction subsystem 166. As shown in FIG. 2, first suction region 86 is proximate to first discharge end 82. As shown in FIGS. 2 and 3, the flow of air through first permeable conveyor belt 80, as represented by arrows 90, may be substantially perpendicular to first direction of conveyance 24. While an object (e.g., a cluster interconnected food products) is being conveyed over first suction region 86 by first conveyor 18, the coefficient of friction between the object and first permeable conveyor belt 80 is temporarily elevated. Air may be drawn into the system by a vacuum pump.

Figure 4:
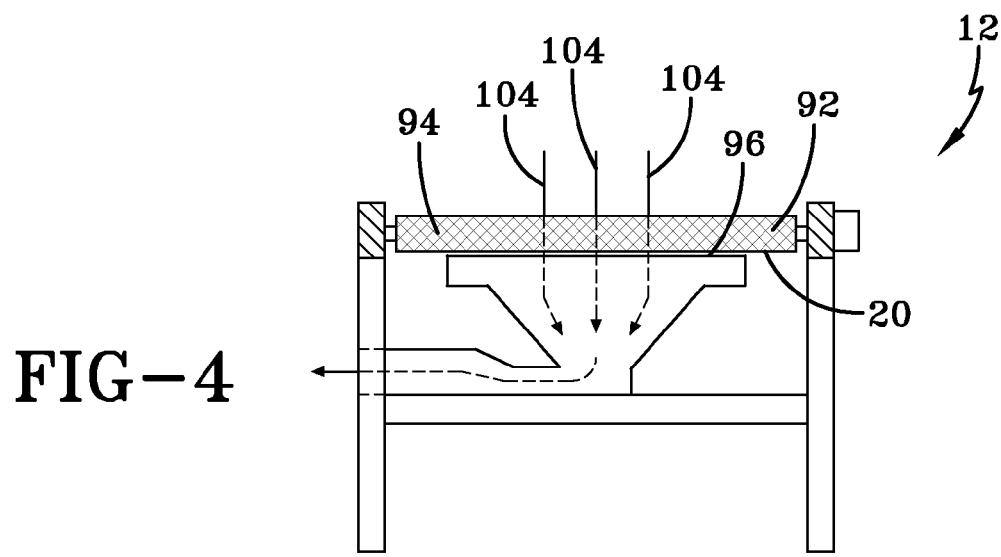
FIG. 4 is a cross-section view, taken along lines 4-4 of FIG. 2, of an exemplary embodiment of the present invention.

Referring to FIGS. 2 and 4, second conveyor 20 of first separator subsystem 12 includes a second permeable conveyor belt 92. An exemplary second permeable conveyor belt 92 is Infralox® LLC Series 1100 flush grid flattop belt, which has a percentage of open area of approximately 63%. Similar to first permeable conveyor belt 80, air can flow relatively freely through second permeable conveyor belt 92. Referring to FIGS. 2 and 4, proximate to a first intake end 94 of second conveyor 20 is a second intake portion 96 of suction subsystem 166. When suction subsystem 166 is activated, air is drawn through second permeable conveyor belt 92 into second intake portion 96. Second intake portion 96 is arranged and disposed to yield a second suction region 98 upon activation of suction subsystem 166. This suction may be generated by the same vacuum pump used for first suction region 86 or by a separate vacuum pump. As shown in FIG. 2, second suction region 98 is proximate to first intake end 94. As shown in FIGS. 2 and 4, the flow of air through second permeable conveyor belt 92, as represented by arrows 104, may be substantially perpendicular to first direction of conveyance 24. As an object is conveyed over second suction region 98 by second conveyor 20, the coefficient of friction between the object and second permeable conveyor belt 92 is temporarily elevated. First intake portion 84 (see FIG. 3) and second intake portion 96 (see FIG. 4) may be discrete from one another, as suggested by a gap 106 between first suction region 86 (see FIG. 2) and second suction region 98 (see FIG. 2) and by FIGS. 3 and 4. One or more vacuum pumps may be used to draw air through first suction region 86 and second suction region 98. In an alternate embodiment, first intake portion 84 and second intake portion 96 may both be defined by a single air channel (e.g., single enclosed passageway), reducing or eliminating gap 106. In this alternate embodiment, one vacuum pump may be used to draw air through first suction region 86 and second suction region 98.

Figure 5:
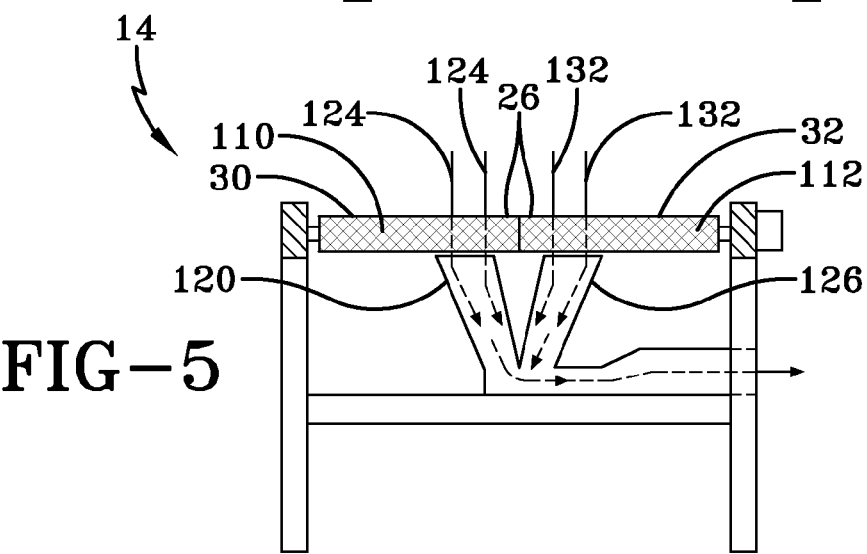
FIG. 5 is a cross-section view, taken along lines 5-5 of FIG. 2, of an exemplary embodiment of the present invention.

Referring to FIGS. 2 and 5, third conveyor 30 of second separator subsystem 14 includes a third permeable conveyor belt 110. Similarly, fourth conveyor 32 of second separator subsystem 14 includes a fourth permeable conveyor belt 112. Similar to first permeable conveyor belt 80 and second permeable conveyor belt 92, air can flow relatively freely through third permeable conveyor belt 110 and fourth permeable conveyor belt 112, respectively. Exemplary third and fourth permeable conveyor belts 110, 112 include Intralox® LLC Series 1100 flush grid flattop belt, which has a percentage of open area of approximately 63%. As shown in FIG. 2, third conveyor 30 and fourth conveyor 32 diverge from a vertex 114 at a predetermined angle and are operated in parallel (as opposed to in series) in a diverging configuration. When suction subsystem 166 is activated, air is drawn through third permeable conveyor belt 110 into a third intake portion 120. Third intake portion 120 is arranged and disposed to yield a third suction region 122 upon activation of suction subsystem 166. As shown in FIG. 2, third suction region 122 is proximate to vertex 114. As shown in FIG. 5, the flow of air through third permeable conveyor belt 110, as represented by arrows 124, may be substantially perpendicular to a second direction of conveyance 36. Similarly, when suction subsystem 166 is activated, air is simultaneously drawn through fourth permeable conveyor belt 112 into a fourth intake portion 126. Fourth intake portion 126 is arranged and disposed to yield a fourth suction region 130 upon activation of suction subsystem 166. As shown in FIG. 2, fourth suction region 130 is proximate to vertex 114 and may oppose third suction region 122. As shown in FIG. 5, the flow of air through fourth permeable conveyor belt 112, as represented by arrows 132, may be substantially perpendicular to second direction of conveyance 36. As an object (e.g., an interconnected food product) is simultaneously conveyed over third suction region 122 and fourth suction region 130, the coefficient of friction between third permeable conveyor belt 110 and the portion of the object overlying third suction region 122 is temporarily elevated, as is the coefficient of friction between fourth permeable conveyor belt 112 and the portion of the object overlying fourth suction region 130. Third intake portion 120 and fourth intake portion 126 may be discrete from one another, as shown in FIG. 5. In an alternate embodiment, third intake portion 120 and fourth intake portion 126 may both be defined by a single air channel (e.g., single enclosed passageway). In such an alternate embodiment, a single, relatively large suction region would encompass vertex 114 and there even may be a flow divider to create third suction region 122 and fourth suction region 130.

Figure 6:
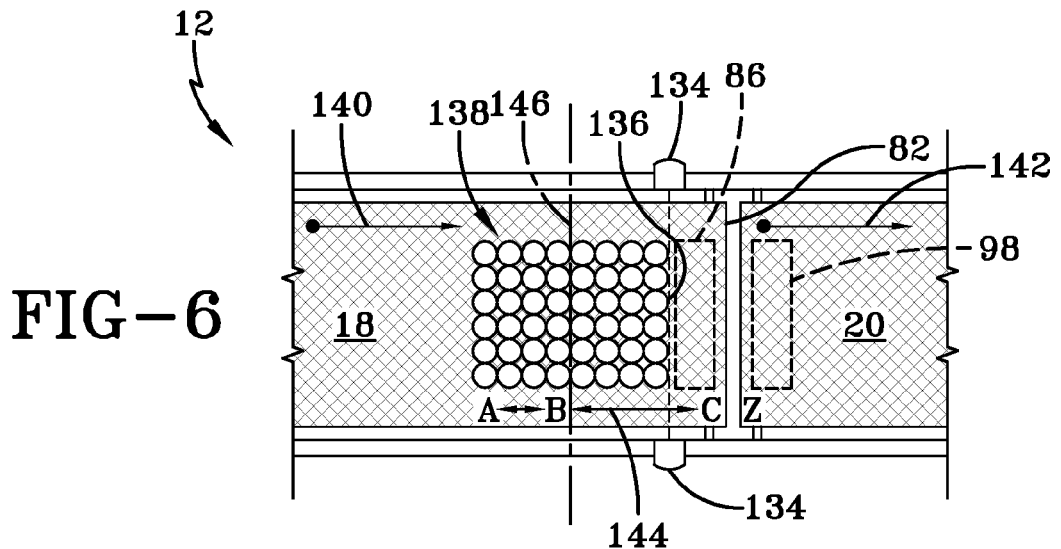
FIG. 6 shows a cluster of interconnected food products being conveyed by a first conveyor of an exemplary embodiment of the present invention.
Figure 7:
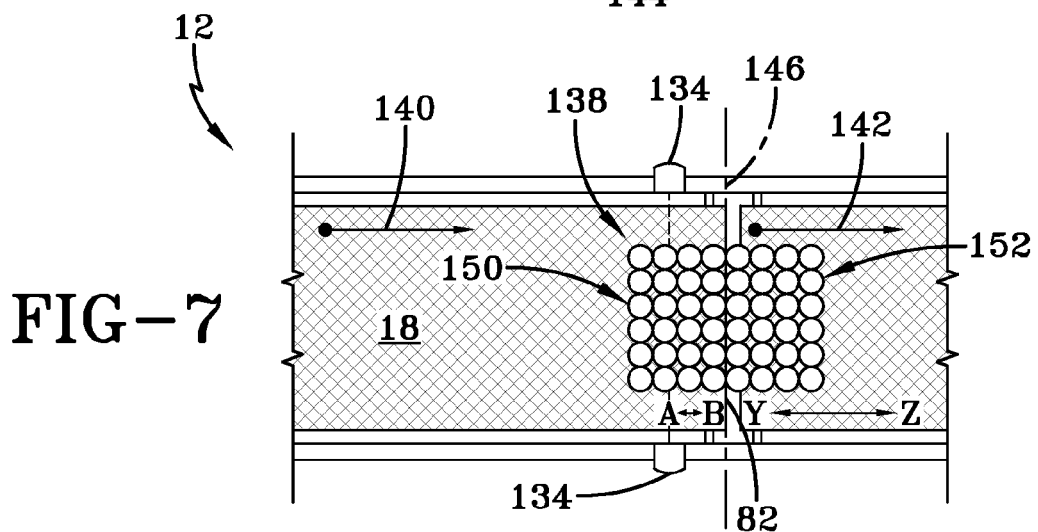
FIG. 7 shows a cluster of interconnected food products being conveyed by a first conveyor and a second conveyor of an exemplary embodiment of the present invention.
Figure 8:
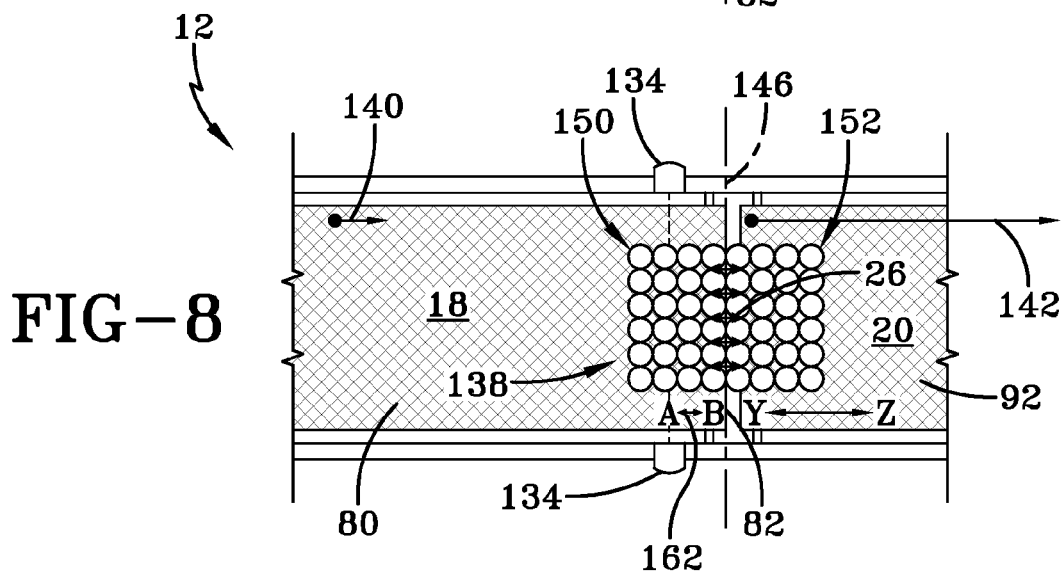
FIG. 8 shows tensional forces being applied to a cluster of interconnected food products by deceleration of a first conveyor and substantially simultaneous acceleration of a second conveyor.

FIGS. 6-11 provide additional details regarding the operation of first separator subsystem 12 and second separator subsystem 14 of system 10. First conveyor 18 may include a sensor 134 configured to detect a leading edge 136 of a cluster of interconnected food products 138. In this embodiment, sensor 134 is positioned a known distance from first discharge end 82 of first conveyor 18, and may be an optical sensor or other sensor recognized as being suitable for this purpose. In FIG. 6, first conveyor 18 and second conveyor 20 are operating at substantially equal speeds, as indicated by the relative lengths of arrow 140 and arrow 142. Upon detecting leading edge 136, sensor 134 sends a signal to a controller (not shown) reporting the event. In response, the controller commands first conveyor 18 and second conveyor 20 each to continue conveying at their present speeds for a first distance 144, which is also depicted as line BC. First distance 144 is a parameter that represents approximately the distance between the plane of separation 146 of cluster of interconnected food products 138 and first discharge end 82 of first conveyor 18. As shown in FIG. 7, first conveyor 18 and second conveyor 20 continue operating at substantially equal speeds until plane of separation 146 is substantially flush with first discharge end 82. The preselected length of line YZ of FIG. 7 is substantially equal to line BC, also preselected, of FIG. 6, illustrating that first conveyor 18 and second conveyor 20 have been conveying at substantially equal speeds. The controller is programmed to vary these distances, which may change depending on the type of interconnected food product. Furthermore, these distances may vary depending on, for example, the size of the initial cluster or whether the cluster of interconnected food products is to be divided evenly or unevenly. Referring still to FIG. 7, a first portion 150 of cluster of interconnected food products 138 overlies first suction region 86 (see FIG. 6), and a second portion 152 of cluster of interconnected food products 138 overlies second suction region 98 (see FIG. 6). At this stage, first portion 150 and second portion 152 respectively adjoin opposing surfaces of plane of separation 146. Next, as shown in FIG. 8, first conveyor 18 decelerates and second conveyor 20 accelerates. Accordingly, as indicated by the relative lengths of arrows 140 and 142, first conveyor 18 is conveying at a slower speed than before, and second conveyor 20 is conveying at a faster speed than before. It will be understood that each of first conveyor 18 and second conveyor 20 may be driven by a motor drivingly connected to a gearcase to enable conveyor speed changes while operating on AC power. During at least the deceleration of first conveyor 18 and the acceleration of second conveyor 20, which occur substantially simultaneously, suction subsystem 166 is activated to yield first suction region 86 (see FIG. 6) and second suction region 98 (see FIG. 6).

Figure 9:
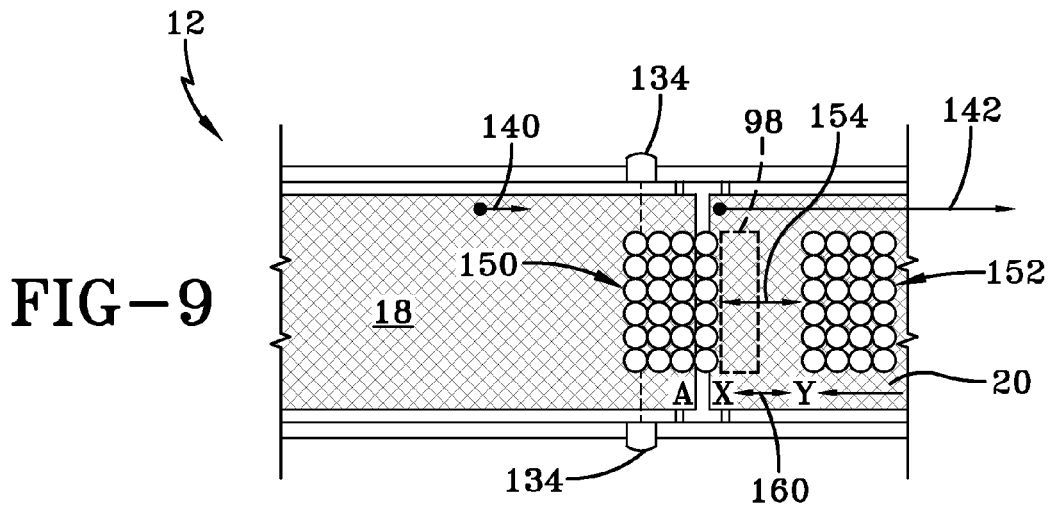
FIG. 9 shows a cluster of interconnected food products having recently been separated by tensional forces applied by a decelerating first conveyor and an accelerating second conveyor.
Figure 10:
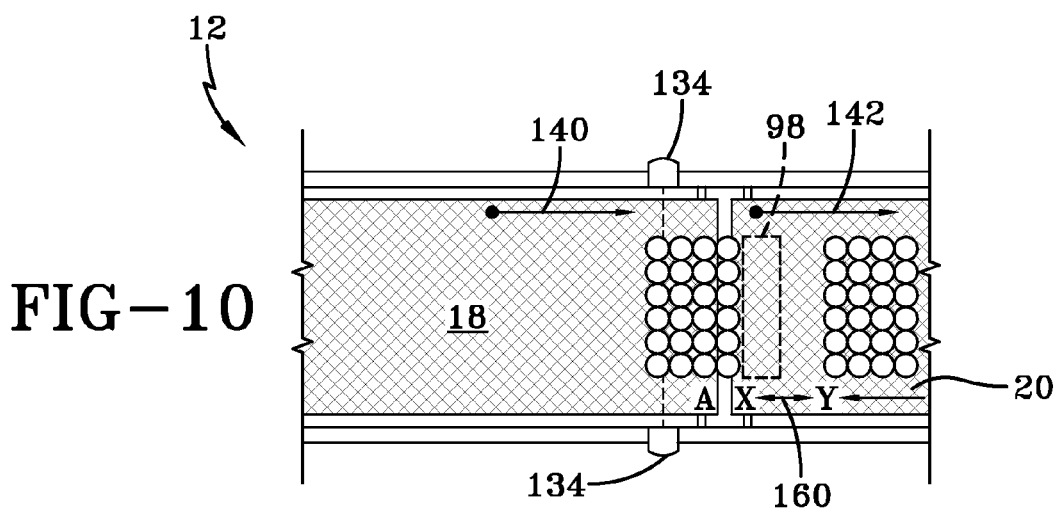
FIG. 10 shows a first conveyor and a second conveyor conveying at substantially equal speeds following the separation of a cluster of interconnected food products.

As first portion 150 is being conveyed over first suction region 86, the coefficient of friction between first portion 150 and first permeable conveyor belt 80 is temporarily elevated, increasing vertical forces applied to first portion 150. Similarly, as second portion 152 is being conveyed over second suction region 98, the coefficient of friction between second portion 152 and second permeable conveyor belt 92 is temporarily elevated, increasing vertical forces applied to second portion 152. Given these temporarily elevated coefficients of friction, the deceleration of first conveyor 18 and the acceleration of second conveyor 20 result in tensional forces 26 applied horizontally across plane of separation 146. As shown in FIG. 9, horizontal tensional forces 26 cause second portion 152 to separate from first portion 150 along plane of separation 146. Because, at this stage, second conveyor 20 is conveying at a greater speed than first conveyor 18, second portion 152 is conveyed a greater distance than first portion 150, resulting in a gap 154 between first portion 150 and second portion 152. Second distance 160, which is also depicted as line XY, is a preselected parameter that represents approximately the distance that controller commands second conveyor 20 to convey at the greater speed. Similarly, third distance 162 (see FIG. 8), which is also depicted as line AB (see FIG. 8), is a parameter that represents approximately the distance that the controller commands first conveyor 18 to convey at the lesser speed. As shown in FIG. 10, once second conveyor 20 conveys second distance 160 at the greater speed, second conveyor 20 decelerates to, for example, the speed represented in FIGS. 6 and 7, as commanded by the controller. Once first conveyer 18 conveys a third distance 162 at the lesser speed, first conveyor 18 accelerates to, for example, the speed represented in FIGS. 6 and 7, as commanded by the controller.

Sensor 134 may instead be substantially aligned with first discharge end 82. In this alternate embodiment, when sensor 134 detects leading edge 136 and communicates this event to the controller, the controller essentially instantaneously commands first conveyor 18 to decelerate and second conveyor 20 to accelerate, to effect the separation. Essentially, first distance 144 (i.e., length of line BC) is zero. In another alternate embodiment, sensor 134 may be arranged and disposed on second conveyor 20. For example, sensor 134 may be aligned with first intake end 94 of second conveyor 20, or aligned further downstream (e.g., point Z). Additionally, the controller may be programmed such that the described process resets or is restarted each time sensor 134 detects a leading edge. Consequently, an error (e.g., a sensor error) that occurs during a separation cycle performed by first separation subsystem 12 is not necessarily perpetuated and, accordingly, may not affect a subsequent separation cycle. Also, this feature may limit the accumulation of errors, as errors occurring during a separation cycle generally cannot be carried forward through a reset or restart to a subsequent separation cycle. At least some of the parameters relating to distances (e.g., first distance 144 or line BC) may be distance-based. For example, these parameters may be configured to be based on a number of revolutions of a shaft or roller that drives a conveyor belt (e.g., first permeable conveyor belt 80). Alternatively, parameters relating to distances may involve time. For example, the controller may assume first conveyor 18 is conveying at X centimeters per second and, therefore, a parameter of Y centimeters will be satisfied in Y/X seconds. In an alternate embodiment, first separator subsystem 12 may be configured to separate a cluster of interconnected food products 138 into three or more (as opposed to merely two) discrete portions. Following sensing of the leading edge by sensor 134, first separator subsystem 12 may effect a separation along plane of separation 146 as described above, yielding a (downstream or leading) second (discrete) portion 152 and a (upstream or trailing) first (discrete) portion 150. Thereafter, second (discrete) portion 152 may be conveyed downstream to second separator subsystem 14. First portion 150 is conveyed a preselected distance by first separator subsystem 12 such that (1) first portion 150 overlies first suction region 86 and second suction region 98, and (2) a second plane of separation is substantially flush with first discharge end 82 of first conveyor 18. At this stage, first conveyor 18 again decelerates and second conveyor 20 again accelerates to separate first portion 150 along a second plane of separation into two discrete subportions, which may then be conveyed downstream to second separator subsystem 14 for further processing.

Figure 11:
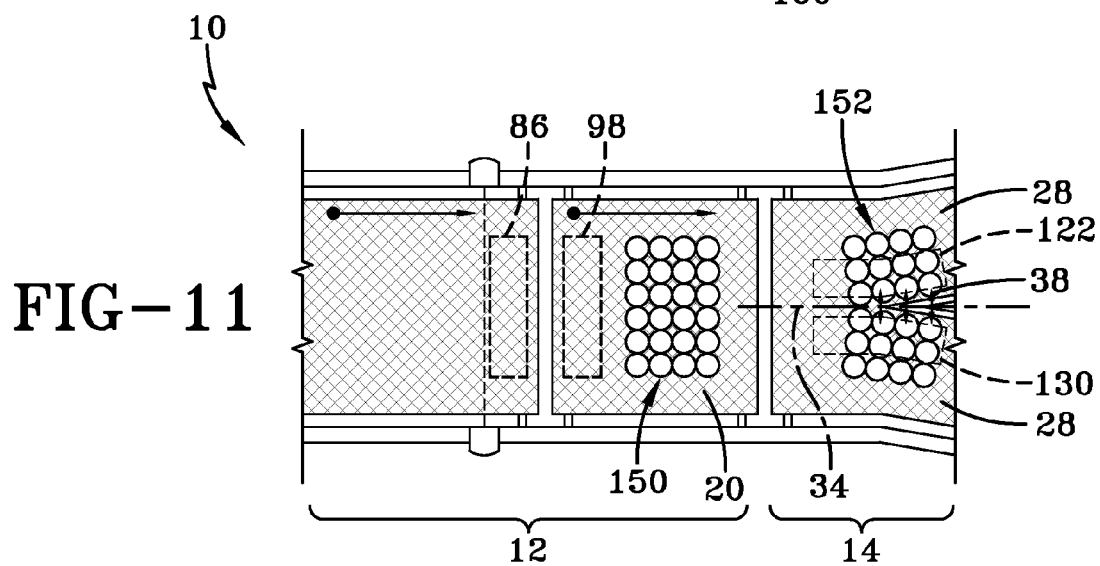
FIG. 11 shows lateral tensional forces being applied by a diverging conveyor to a derivative cluster of the cluster of interconnected food products.

Referring now to FIG. 11, second portion 152 is thereafter conveyed by second conveyor 20 to second separator subsystem 14 for separation along plane of separation 34, which is at a predetermined angle to second direction of conveyance 36 (see FIG. 1). The predetermined angle will depend on the tensional forces required to separate product, the forces increasing with the angle. Second portion 152, which in this example consists of a cluster of 24 interconnected food products, is shown in FIG. 11 being separated by diverging conveyors 28, specifically third conveyor 30 and fourth conveyor 32. Second portion 152 has nearly completed the process of being separated by second separation subsystem 14, which in this example will yield two clusters of 12 interconnected food products. During separation by second separation subsystem 14, suction subsystem 166 is activated to yield third suction region 122 and fourth suction region 130. As second portion 152 is simultaneously conveyed over third suction region 122 and fourth suction region 130, the coefficient of friction between second portion 152 and diverging conveyors 28 is temporarily elevated. Given these temporarily elevated coefficients of friction, the divergence of the diverging conveyors 28 (i.e., third conveyor 30 and fourth conveyor 32) results in tensional forces 38 along plane of separation 34. As shown in FIG. 11 (and FIG. 2), tensional forces 38 cause second portion 152 to separate along plane of separation 34, eventually yielding two clusters of 12 interconnected food products, which may be conveyed to turner subsystem 16, described previously. Second separator subsystem 14 separates first portion 150 in a similar manner.

FIGS. 6-11 show that none of the conveyors must be stopped to achieve any of the described separations, thereby encouraging high throughput. Additionally, no blade or other cutting device is used in effecting the described separations. For some applications, the order of the first separator subsystem 12 and the second separator subsystem 14 may be reversed, although the first separator subsystem 12 may need to be modified (e.g., widened) in some instances to match up appropriately with a second discharge end 170 (see FIG. 2) of diverging conveyor 28. Also, while it is described previously herein that the suction subsystem 166 is activated for certain events, suction subsystem 166 may instead remain in a continuously active state. In other words, suction subsystem 166 may remain active throughout the separation cycle.

Figure 12:
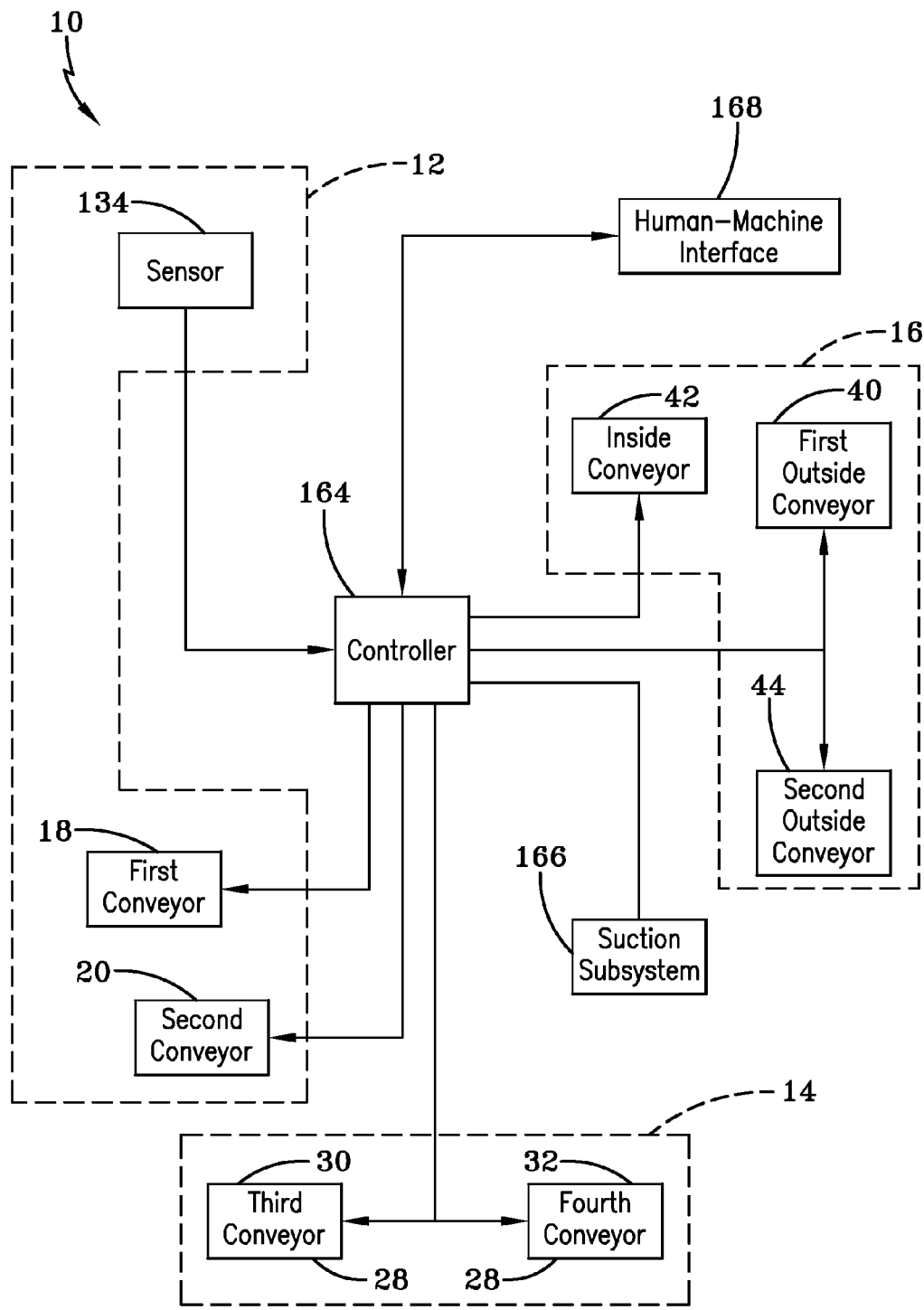
FIG. 12 is a block diagram showing the relationship among various major components of an exemplary embodiment of the system for separating a cluster of interconnected food products.

FIG. 12 shows the relationship among components of system 10. Sensor 134 is shown in communication with a controller 164, which controls the operation of, and is in communication with, first conveyor 18 and second conveyor 20. Controller 164 commands first conveyor 18 and second conveyor 20 partially in response to sensory information received from sensor 134. First conveyor 18, second conveyor 20, and sensor 134 are included in first separator subsystem 12. Additionally, controller 164 is in communication with second separator subsystem 14, which includes diverging conveyor 28, which may comprise two conveyors, specifically, third conveyor 30 and fourth conveyor 32. Controller 164 is also in communication with turner subsystem 16, which may comprise first outside conveyor 40, second outside conveyor 44, and inside conveyor 42. Controller 164 is in communication with a suction subsystem 166, which when activated is configured to yield first suction region 86 (see FIG. 2), second suction region 98 (see FIG. 2), third suction region 122 (see FIG. 2), and fourth suction region 130 (see FIG. 2). In addition to components such as first intake portion 84 (see FIG. 3), suction subsystem 166 includes one or more devices recognized in the art for creating suction or a partial vacuum (e.g., a vacuum). An (optional) human-machine interface (HMI) 168 in communication with controller 164 enables a user to enter values for the various parameters relating to operation of system 10. An exemplary HMI 168 is a touch-screen display. In an alternate embodiment, controller 164 may receive commands from a central processing unit (not shown). Software can be configured to operate system 10 selectively, dependent upon the food product and the desired division of the food product, so that system 10 can be used for a plurality of different food products very quickly, if not substantially instantaneously. As shown in FIG. 12, system 10 is configured to perform in an open loop. In an alternate embodiment, system 10 may be configured to perform in a closed loop, with controller 164 receiving feedback signals from one or more components, thereby enabling controller 164, in some instances, to more closely tailor operations to changes in operating conditions.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for separating a cluster of interconnected food products, the system comprising:
    a first conveyor comprising a discharge end and a first permeable conveyor belt, the first conveyor being configured to decelerate and accelerate;
    a second conveyor in series with the first conveyor, the second conveyor comprising an intake end and a second permeable conveyor belt, the second conveyor being configured to accelerate and decelerate;
    a suction subsystem comprising an intake portion proximate to the discharge end of the first conveyor and the intake end of the second conveyor, the suction subsystem being configured, arranged and disposed to generate suction through the first permeable conveyor belt at a first region proximate to the discharge end and to generate suction through the second permeable conveyor belt at a second region proximate to the intake end;
    a sensor configured, arranged and disposed to sense a leading edge of a cluster of interconnected food products as the cluster of interconnected food products is being conveyed by the system; and
    a controller in communication with and configured to control the first conveyor, the second conveyor, the suction subsystem and the sensor, the controller configured to accelerate and decelerate the first conveyor and the second conveyor, so that the acceleration and deceleration of the first conveyor and the second conveyor selectively separate the cluster of interconnected food products.

2. The system of claim 1, further comprising a diverging conveyor in series with the second conveyor, the diverging conveyor comprising a third conveyor and a fourth conveyor diverging from a vertex, the third conveyor comprising a third permeable conveyor belt, the fourth conveyor comprising a fourth permeable conveyor belt, the suction subsystem further comprising a second intake portion proximate to the vertex, the suction subsystem being further configured, arranged and disposed to generate suction through the third permeable conveyor belt at a third region proximate to the vertex and to generate suction through the fourth permeable conveyor belt at a fourth region proximate to the vertex.

3. The system of claim 1, further comprising a turning subsystem in series with the second conveyor, the turning subsystem comprising a third conveyor parallel to a fourth conveyor, the turning subsystem further comprising a fifth conveyor interposed in parallel between the third conveyor and the fourth conveyor, the third conveyor being configured to convey at a first speed, the fifth conveyor being switchable between the first speed and a second speed.

4. The system of claim 3, wherein the first speed is greater than the second speed.

5. The system of claim 3, wherein the fourth conveyor is configured to operate at the first speed.

6. The system of claim 2, further comprising a turning subsystem in series with the diverging conveyor, the turning subsystem comprising a fifth conveyor parallel to a sixth conveyor, the turning subsystem further comprising a seventh conveyor interposed in parallel between the fifth conveyor and the sixth conveyor, the fifth conveyor being configured to convey at a first speed, the seventh conveyor being switchable between the first speed and a second speed.

7. The system of claim 6, wherein the first speed is greater than the second speed.

8. The system of claim 6, wherein the sixth conveyor is configured to operate at the first speed.

9. The system of claim 1, wherein the system does not include a blade or other cutting device.

10. A system for separating a cluster of interconnected food products, the system comprising:
 a first conveyor in communication with a controller, the first conveyer comprising a discharge end and a first permeable conveyor belt, the first conveyor being configured to respond to commands received from the controller, and being configured to convey at a first speed, to decelerate from the first speed to a second speed, to convey at the second speed, and to accelerate from the second speed to a third speed selected from the group consisting of the first speed and another speed greater than the second speed;
 a second conveyor in series with the first conveyor and in communication with the controller, the second conveyor comprising an intake end and a second permeable conveyor belt, the second conveyor being configured to respond to commands received from the controller, and being configured to convey at the first speed, to accelerate from the first speed to a fourth speed, to convey at the fourth speed, and to decelerate from the fourth speed to a fifth speed selected from the group consisting of the first speed and another speed less than the fourth speed;
 a suction subsystem comprising an intake portion proximate to the discharge end and the intake end, the suction subsystem being configured, arranged and disposed to generate suction through the first permeable conveyor belt at a first region proximate to the discharge end and to generate suction through the second permeable conveyor belt at a second region proximate to the intake end;
 a sensor in communication with the controller, the sensor being configured, arranged and disposed to sense a leading edge of a cluster of interconnected food products as the cluster of interconnected food products is being conveyed by the system and send a corresponding signal to the controller; and
 the controller being configured to receive the corresponding signal from the sensor and, in response to the received corresponding signal, command the first conveyor to decelerate from first speed to second speed and the second conveyor to substantially simultaneously accelerate from the first speed to the fourth speed to separate, along a plane substantially perpendicular to and between the first region and the second region, the cluster of interconnected food products into a first portion and a second portion as the cluster of interconnected food products is being conveyed over the first region and the second region.

11. The system of claim 10, further comprising a diverging conveyor in series with the second conveyor, the diverging conveyor comprising a third conveyor and a fourth conveyor diverging from a vertex, the third conveyor comprising a third permeable conveyor belt, the fourth conveyor comprising a fourth permeable conveyor belt, the suction subsystem further comprising a second intake portion proximate to the vertex, the suction subsystem being further configured, arranged and disposed to generate suction through the third permeable conveyor belt at a third region proximate to the vertex and to generate suction through the fourth permeable conveyor belt at a fourth region proximate to the vertex.

12. The system of claim 11, further comprising a turning subsystem in series with the diverging conveyor, the turning subsystem comprising a fifth conveyor parallel to a sixth conveyor, the turning subsystem further comprising a seventh conveyor interposed in parallel between the fifth conveyor and the sixth conveyor, the fifth conveyor being configured to convey at a sixth speed, the seventh conveyor being switchable between the sixth speed and a seventh speed.

13. The system of claim 12, wherein the sixth speed is substantially equal to the first speed.

14. The system of claim 12, wherein the sixth speed is greater than the seventh speed.

15. The system of claim 12, wherein the sixth conveyor is configured to operate at the sixth speed.

16. The system of claim 10, wherein the system does not include a blade or other cutting device.

17. A method of separating a cluster of interconnected food products, the method comprising:
 providing a first conveyor comprising a discharge end and a first permeable conveyor belt, the first conveyor being configured to operate at a first speed and to decelerate from the first speed;
 providing a second conveyor in series with the first conveyor, the second conveyor comprising an intake end and a second permeable conveyor belt, the second conveyor being configured to operate at a speed substantially equal to the first speed and to accelerate from the first speed;
 providing a suction subsystem comprising an intake portion proximate to the discharge end of the first conveyor and the intake end of the second conveyor, the suction subsystem being configured, arranged and disposed to generate suction through the first permeable conveyor belt at a first region proximate to the discharge end and to generate suction through the second permeable conveyor belt at a second region proximate to the intake end;
 operating the first conveyor at a first speed;
 operating the second conveyor at a speed substantially equal to the first speed;
 operating the suction subsystem to generate suction through the first region and the second region;
 providing a cluster of interconnected food products, the cluster of interconnected food products comprising a first portion and a second portion, the first portion adjoining the second portion;
 conveying the cluster of interconnected food products until the first portion overlies the first region and the second portion overlies the second region; and
 decelerating the first conveyor and substantially simultaneously accelerating the second conveyor to apply tensional forces to the cluster of interconnected food products along a first plane of separation between the first portion and the second portion, the tensional forces being sufficient to separate the cluster of interconnected food products along the first plane of separation, thereby yielding a first discrete portion and a second discrete portion.

18. The method of claim 17, further comprising:
 providing a diverging conveyor in series with the second conveyor, the diverging conveyor comprising a third conveyor and a fourth conveyor diverging from a vertex, the third conveyor comprising a third permeable conveyor belt, the fourth conveyor comprising a fourth permeable conveyor belt;

providing a supplementary suction subsystem, the supplementary suction subsystem comprising a second intake portion proximate to the vertex, the supplementary suction subsystem being further configured, arranged and disposed to generate suction through the third permeable conveyor belt at a third region proximate to the vertex and to generate suction through the fourth permeable conveyor belt at a fourth region proximate to the vertex, the third region diverging from the fourth region;

operating the diverging conveyor;

operating the supplementary suction subsystem to generate suction through the third region and the fourth region;

conveying the second discrete portion until a first subportion of the second discrete portion overlies at least part of the third region and a fourth subportion of the second discrete portion overlies at least part of the fourth region; and continue conveying the second discrete portion over the third region and the fourth region to apply lateral tensional forces to the second discrete portion along a second plane of separation between the first subportion and the second subportion, the lateral tensional forces being sufficient to separate the second discrete portion along the second plane of separation, thereby yielding a first discrete subportion and a second discrete subportion.

19. The method of claim 18, wherein the first plane of separation is substantially perpendicular to the second plane of separation.

20. The method of claim 19, wherein the method does not include slicing or otherwise cutting the cluster of interconnected food products, the first discrete portion, or the second discrete portion.

\* \* \* \* \*